United States Patent Office 2,972,056
Patented Feb. 14, 1961

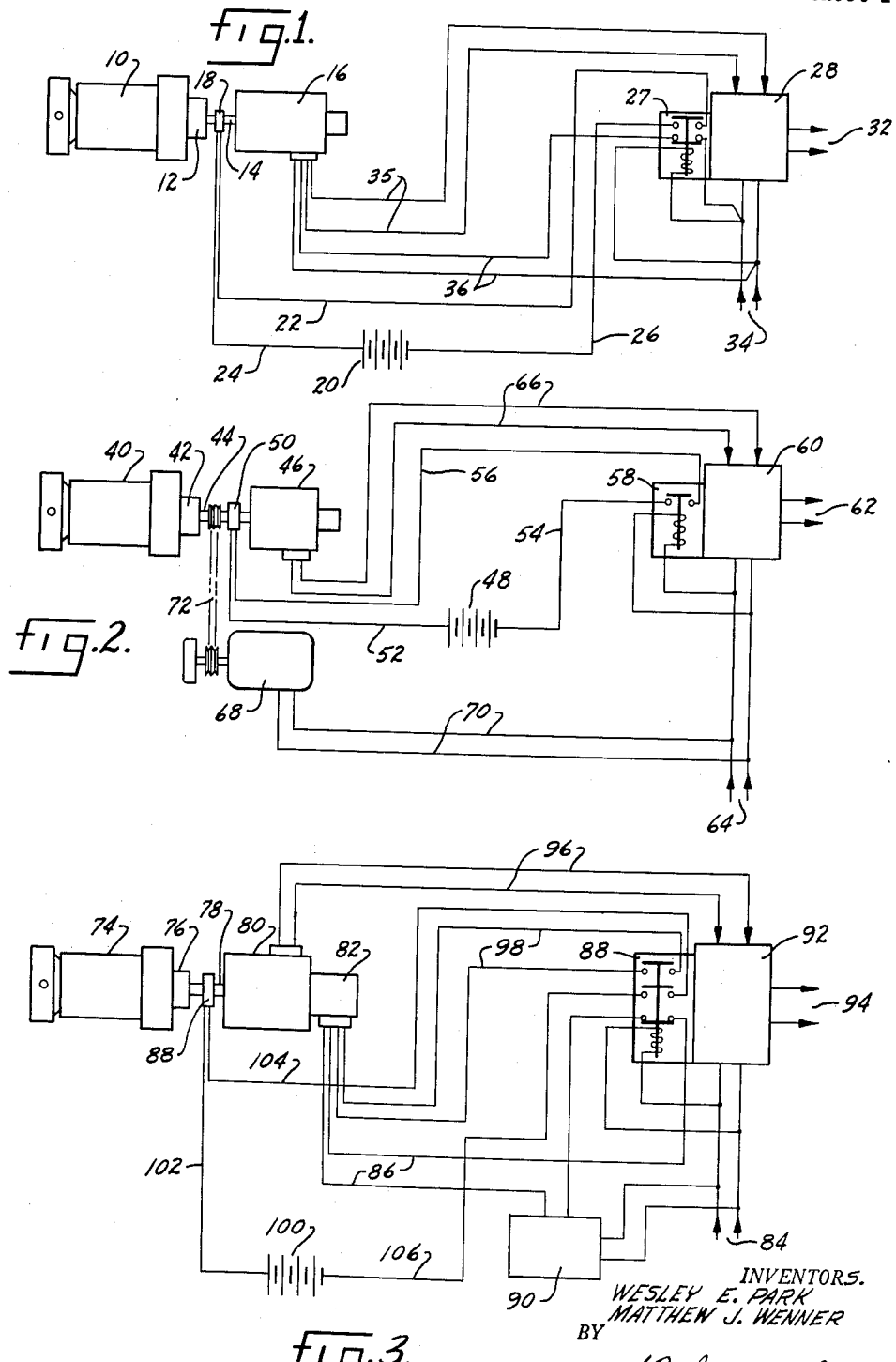

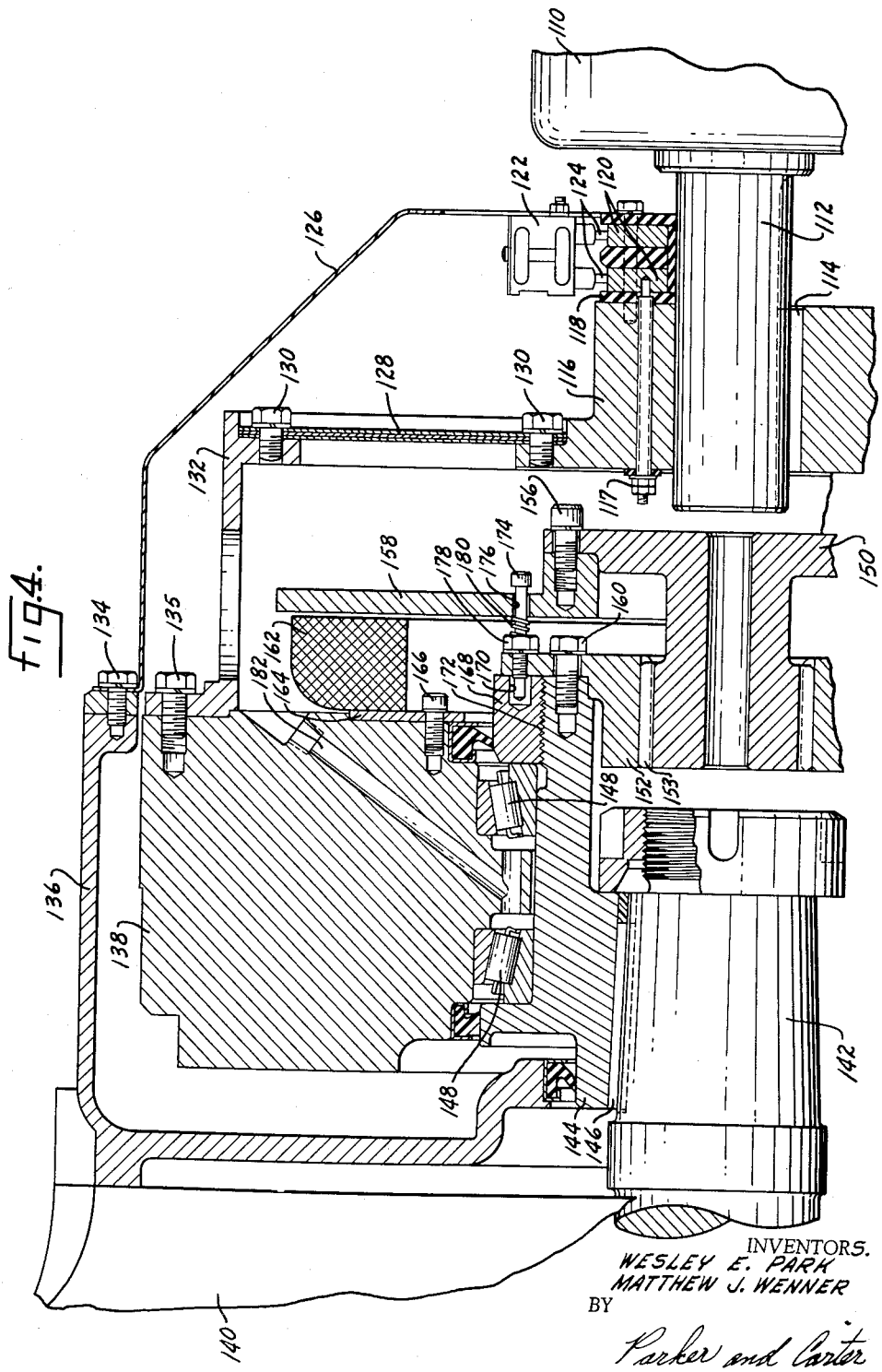

2,972,056
ENGINE GENERATOR SET

Wesley E. Park and Matthew J. Wenner, Milwaukee, Wis., assignors to Automatic Power, Inc., Houston, Tex., a corporation of Texas Filed July 25, 1958, Ser. No. 750,931

14 Claims. (Cl. 290—30)

The present invention relates to unattended power plants and means for starting the like.

One purpose of our invention is to provide a power plant for an unattended installation which will supply electric power upon failure of the normal operating power.

Another purpose is a power plant for remote installation include a starting-generating unit, an engine, and a means for magnetically coupling the two.

Another purpose is a means of magnetically coupling the rotating shaft of a starting-generating unit to the crank shaft of an engine associated therewith.

Another purpose is a means of magnetically coupling the crank shaft of an engine with a fly wheel rotating freely thereon, which fly wheel is driven by the shaft of a starting-generating unit.

Another purpose is a magnetic coupling means between the crank shaft of an engine and the rotating shaft of a starting-generating unit, which means is activated on the failure of the normal power supplied to the starting-generating unit.

Another purpose is a means of automatically starting an engine upon the failure of the normal power supplied to a power plant, which engine then drives an alternator which supplies electric power.

Other purposes will appear from time to time in the ensuing specification and drawings wherein:

Figure 1 is a schematic drawing of one form of the invention,

Figure 2 is a schematic drawing of another form of the invention,

Figure 3 is a schematic drawing of a third form of the invention,

Figure 4 is an axial section with parts in full, of a coupling mechanism used in the invention.

In Figure 1, 10 indicates an internal combustion engine connected by a magnetic clutch 12, hereinafter described, to the shaft 14 of a starting-generating unit 16. A battery 20, or other suitable source of power, supplies electric current to the slip rings indicated at 18 by means of wires 22, 24, 26, and a voltage or frequency sensing relay 27. A transfer switch 28 serves to switch the load indicated at 32 to either the normal A.C. power supply shown at 34 or the alternate or standby power obtained from the starting-generating unit 16 by means of wires 35.

The windings of the starting-generating unit 16 are such that it will operate as a motor when supplied with electric current, and as a generator when mechanically driven. For example, current may be supplied to the windings from the source 34 by wires 36 which are connected to contacts in the relay 27. When the normal power supply fails the voltage or frequency sensing relay 27 is released, which is the reverse of the position of the relay 27 in Figure 1. Current is then supplied to the slip rings 18 from the battery or other suitable source of electric current 20 which serves to actuate the magnetic clutch, thereby connecting the internal combustion engine 10 to the starting-generating unit 16. The engine 10 then mechanically drives the starting-generating unit 16. Upon the failure of the normal power supply the transfer switch changes the load to the emergency power now being supplied by starting-generating unit 16 operating as a generator.

Referring now to Figure 2, we have a power plant arrangement wherein 40 indicates an internal combustion engine connected by means of a magnetic clutch 42 to the shaft 44 of alternator 46. A battery or other suitable source of electric power 48 is connected to the slip rings 50 by means of wires 52, 54, 56, and voltage or frequency sensing relay 58. The transfer switch 60 provides a means of switching the load 62 to either the normal A.C. power supply 64 or the standby A.C. power supplied from the alternator 46. Wires 66 connect the alternator to the transfer switch. An induction motor 68, which receives its electric power through wires 70 from the normal A.C. power supply 64, is connected by belt driving means 72 to shaft 44 of the alternator 46.

Under normal operating conditions the induction motor 68 drives the shaft 44 of the alternator 46. Upon the failure of the normal A.C. power supply indicated at 64 the voltage or frequency sensing relay 58 is released, and electric current is supplied to the slip rings 50 from the battery or other suitable source of power 48. The power supplied to the slip rings 50 actuates the magnetic clutch 42 which couples the internal combustion engine 40 to the rotating shaft 44 of the alternator 46. The internal combustion engine 40 is started by means hereinafter described, and then drives the alternator 46 which supplies electric power through wires 66 to the transfer switch 60. Upon the failure of the A.C. power, the load 62 is switched to the power being supplied by the alternator 46. The alternator 46 and the motor 68 comprises the starting-generating unit.

In Figure 3 we show an arrangement for our power plant wherein 74 indicates the internal combustion engine connected by magnetic clutch 76 to the shaft 78 of the alternator 80. The motor exciter shown at 82 is driven by power from the normal A.C. power supply 84 supplied through motor leads 86; the voltage or frequency sensing relay 88, and rectified by the full wave rectifier 90. As before, the transfer switch 92 serves to switch the load 94 from either the normal power supply 84 or the standby power supplied from the alternator 80 through the leads 96.

Upon the failure of the normal power supply shown at 84 the voltage or frequency sensing relay 88 is released thereby connecting the exciter leads shown at 98. The release of the transfer switch 88 also removes the D.C. power supplied to the motor by the full wave rectifier. Another function of the sensing relay 88 is to connect the battery or other suitable source of electric power shown at 100 to the slip rings 88 through leads 102, 104 and 106. The power supplied to the slip rings serves to actuate the magnetic clutch, which couples the engine 74 to the shaft 78 of the alternator 80. The starting-generating unit in this variation of the invention consists of the alternator and the motor exciter. Under normal operating conditions the motor exciter 82 drives the shaft 78 of the alternator 80.

Referring now to Figure 4, 110 indicates a starting-generating unit with a shaft 112 extending therefrom. The shaft 112 is keyed at 114 to a cylindrical generator drive adapter 116. The insulation shown at 118 is used to electrically isolate the slip rings 120 mounted therein, from the generator drive adapter 116 and the shaft 112. 122 indicates a brush holder which mounts brushes 124 for contact with slip rings 120.

A cylindrical laminated flexible coupling 128 or the like couples the generator drive adapter 116 to a cylindrical coupling adapter 132 and is fastened thereto by screws or the like 130. Screws or any suitable connecting elements 134 fastens a cylindrical guard 126 to a cylindrical fly wheel housing 136. A high inertia fly wheel 138, mounted within the fly wheel housing 136, is attached to the flexible coupling adapter 132 by screws 135 or the like.

An adapter hub 144 may be mounted on the crankshaft 142 which extends from the engine housing 140 and is keyed thereto at 146. Suitable bearings, indicated at 148, are mounted between the fly wheel 138 and the adapter hub 144 and allow the fly wheel to be freely rotatable thereon.

A somewhat cylindrical armature drive adapter 150, upon which is mounted a fly wheel hub drive adapter 152, is interposed between the shaft 112 and the crank shaft 142. The fly wheel hub drive adapter 152 is slideably splined as at 153 to the armature drive adapter 150 to allow an armature 158 to be drawn to a magnetic pole piece 162. The armature 158 is connected by screws or the like 156 to the armature drive adapter 150. Screws 160 may be used to connect the fly wheel hub drive adapter 152 to the adapter hub 144.

This pole piece 162 is fastened by a suitable plate 164 and screws 166 or the like to the fly wheel 138. A cylindrical bearing lock nut 168 with a bore 170 is threadedly engaged with the adapter hub 144 as shown at 172. The magnetic pole piece 162 is connected by means of suitable wires, not shown in the drawings, to the insulated pin 117 inserted in the generator drive adapter 116 which supplies current from the slip rings 12 to the coupling. A stud 174 inserted through aperture 176 in the armature 158, is fastened by a nut or the like 178 to the fly wheel hub drive adapter 152. Interposed between the armature 158 and the nut or the like shown at 178 is a compression spring 180, which biases the armature 158 away from the magnetic pole piece shown at 162.

The passageway shown generally at 182 is for lubrication purposes.

The use, operation and function of the invention is as follows:

In the normal operating condition, power is supplied by the line, for example, at 34 at Figure 1. The generator will be motoring and will be rotating the fly-wheel. For example, in the Figure 2 form the indiction motor will drive that shaft and the fly-wheel and in the forms in Figures 1 and 3 the motor windings in the generator itself will rotate the shaft. Regardless of which form is used, in the normal operating condition the generator shaft will be rotating the fly-wheel. The engine crank shaft will be stationary and the engine will be in a standby condition.

Upon failure of the nromal power supply, the transfer switch and relay will be actuated. Current will be supplied to the coupling through the brushes and slip rings thereby coupling the engine crank shaft to the fly-wheel. It will be noted that the current supplied to the coupling energizes the pole piece or field 162 which attracts the armature 158. Since the armature is splined to the adapter 144, the engine crank shaft will be coupled to the fly-wheel.

Since the fly-wheel is rotating and has a relatively high inertia, the engine will be turned over and will start. It should be understood that the engine may be any suitable type, for example diesel, dual fuel, gas, or spark fired. We prefer a simple spark fired gas engine which, when started, may have its controls set to bring the engine up to a predetermined load and speed. But the particular engine used and the details thereof are not important to this invention.

As soon as the engine is started, it will drive the generator since the magnetic coupling will still be energized. The starting-generating unit, regardless of what form is used, either Figures 1, 2 or 3, now functions as a generator and supplies current to the line.

A device such as we have described is useful in a micro wave radio relay tower which is remote and inaccessible, and at which it is absolutely essential that there be no prolonged interruption of electric power. We do not mean to limit ourselves to this particular use, as there are many other operations where it is extremely necessary that there be no prolonged interruption of electric power.

One of the advantages of the invention is that the fly-wheel is supported on the engine crank shaft. For example, note in Figure 4 that the fly-wheel is mounted on suitable bearings 148 which are carried on the adapter 144 which, in turn, is keyed to the engine crank shaft. Therefore the physical support of the heavy fly-wheel is on the engine bearings, and not on the bearings of the starting-generating unit. This is important since engine bearings are specifically designed for heavy loads whereas a normal starting-generating unit or generator unit has bearings which are not sufficiently sturdy to stand up to excessive loads. Therefore this invention puts as much of the overall weight of the coupling or connection between the engine and the generator on the engine shaft rather than on the generator shaft since the engine bearings are constructed for heavy duty and will carry the load whereas the generator bearings wont.

It should be realized that if the generator may be purchased as a standard unit from any one of the many generator manufacturers, the cost will be much less than if the generator must be especially built with heavy duty bearings. On the other hand engines, by the very nature of the service they are intended to perform, are initially constructed with heavy duty bearings.

The invention additionally has the advantage of simplicity in that the entire unit may be made and assembled with a minimum number of special parts.

It will be realized that whereas we have described a particular invention, numerous modifications, substitutions, alterations or the like, could be made without departing from the scope of my invention. Therefore we only wish to be limited by the following claims.

We claim:

1. In a power plant, a starting-generating unit having a shaft extending therefrom, an engine associated with the starting-generating unit and having a crank shaft, a fly wheel rotatably mounted on the engine crank shaft so as to be supported thereby but free for relative rotation, a drive between the fly wheel and the shaft of the starting-generating unit so that they rotate together, and a coupling between the fly wheel and the crank shaft which is actuated when outside current fails, thus causing the engine to drive the starting-generating unit, so as to supply electric current.

2. The structure of claim 1 further characterized in that the coupling between the fly wheel and the crank shaft is a magnetic coupling.

3. The structure of claim 2 further characterized in that the starting-generating unit is a machine adapted to operate as a motor when supplied with outside current and when driven to operate as a generator to supply current.

4. The structure of claim 2 further characterized by a starting-generating unit including an alternator with a shaft extending therefrom, and a motor adapted to rotate the shaft of the alternator.

5. The structure of claim 2 wherein the magnetic coupling includes an armature connected to the crank shaft, a magnetic pole piece connected to the fly wheel, the armature being adjacent to the magnetic pole piece and constructed and arranged to be drawn towards the magnetic pole piece by a magnetic field developed therein, which magnetic field is developed upon the failure of outside current.

6. A power plant including an engine with a crank shaft, a fly wheel rotatably mounted on and supported by the crank shaft, bearings interposed between the crank shaft and the fly wheel so that the fly wheel is free for relative rotation, a starting-generating unit having a shaft extending therefrom, a drive between the shaft and the fly wheel so that they rotate together, slip rings mounted on and circumscribing the shaft, brushes positioned for contact with the slip rings, a source of electric current connected to the brushes, a magnetic pole piece mounted on the fly wheel adapted to have a magnetic field induced therein by the flow of electric current, wires connecting the slip rings to the magnetic pole piece, and an armature mounted on and longitudinally movable to the crank shaft, the armature being adjacent to the magnetic pole piece and being drawn to the magnetic pole piece when the pole piece has a magnetic field induced therein, thus engaging the engine crank shaft to the shaft of the starting-generating unit.

7. The structure of claim 6 wherein a magnetic field is induced in the magnetic pole piece upon the failure of outside current.

8. The power plant of claim 6 further characterized by and including a switching means interposed between the source of electric current and the brushes, which switching means connects the brushes to the source of electric current upon the failure of outside current.

9. The structure of claim 6 wherein the starting-generating unit is a machine adapted to operate as a motor when supplied with outside current and when driven to operate as a generator to supply current.

10. The structure of claim 6 further characterized by a starting-generating unit including an alternator with a shaft extending therefrom, and a motor constructed and arranged to rotate the shaft of the alternator.

11. The structure of claim 2 further characterized that the starting-generating unit includes an alternator and an associated motor exciter.

12. In a power plant, a starting-generating unit having a shaft extending therefrom, an engine associated with the starting-generating unit and having a crankshaft, a flywheel rotatably mounted on the engine crankshaft so as to be supported thereby but free for relative rotation, a drive to the flywheel so that when the starting-generating unit is in operation, the flywheel will be rotated, a coupling effective between the shaft of the starting-generating unit and the engine crankshaft, and means responsive to a change in outside current for actuating the coupling.

13. The structure of claim 12 further characterized in that the coupling is connected between the flywheel and the crankshaft of the engine.

14. The structure of claim 12 further characterized in that the means responsive to a change in outside current for actuating the coupling includes means responsive to a failure of outside current for actuating the coupling.

References Cited in the file of this patent
UNITED STATES PATENTS

| | | |
|---|---|---|
| 1,703,064 | Griffiths | Feb. 19, 1929 |
| 2,302,192 | Dannheiser | Nov. 17, 1942 |
| 2,427,678 | Laging | Sept. 23, 1947 |
| 2,476,086 | Dorey | July 12, 1949 |
| 2,688,704 | Christenson | Sept. 7, 1954 |